(Model.)
R. PEMBLE, Sr., R. PEMBLE, Jr., & J. H. HAYES.
Hog Nose Cutter.
No. 242,036.      Patented May 24, 1881.
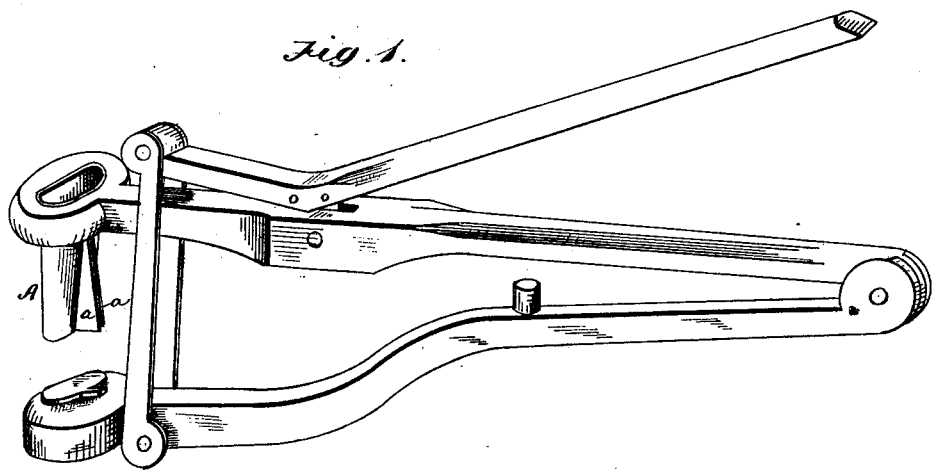
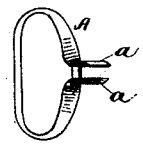
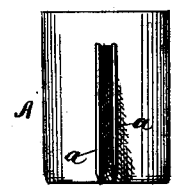
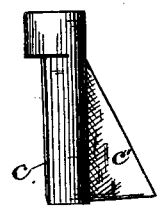
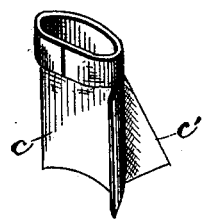
Attest,
W. H. H. Knight.
W. Blackstock.
Inventors;—
Robert Pemble Sr.
Robert Pemble Jr.
and James H. Hayes.
by Hill & Church
their attys.

UNITED STATES PATENT OFFICE.

ROBERT PEMBLE, SR., ROBERT PEMBLE, JR., AND JAMES H. HAYES, OF CERRO GORDO, ILLINOIS.

HOG-NOSE CUTTER.

SPECIFICATION forming part of Letters Patent No. 242,036, dated May 24, 1881.

Application filed February 17, 1881. (Model.)

*To all whom it may concern:*

Be it known that we, ROBERT PEMBLE, Sr., ROBERT PEMBLE, Jr., and JAMES H. HAYES, all of Cerro Gordo, in the county of Piatt and State of Illinois, have invented certain new and useful Improvements in Hog-Nose Cutters; and we do hereby declare the following to be a full, clear, and exact description of the same, reference being had to the accompanying drawings, forming part of this specification, in which—

Figure 1 represents the improved cutter in perspective and attached to an operating instrument; Fig. 2, a plan view of the same; Fig. 3, a rear view; and Figs. 4 and 5, respectively, a side view and perspective view of a modification of the invention.

Similar letters of reference in the several figures denote the same parts.

This invention relates to improvements in instruments for cutting the cartilage or "rooter" of a hog's nose to prevent him from rooting; and it consists in an improved form of cutter, which I will now proceed to describe.

In the drawings, A represents the improved cutter applied to a form of operating instrument for which Letters Patent No. 233,694 were granted and issued to us October 26, 1880. It may, however, be applied to other forms of instruments. The said cutter is made hollow and provided at its rear side with parallel flanges $a$ $a$, which are beveled down to sharp edges at the cutting end of the cutter, as shown in Fig. 3.

The operation of the cutter thus formed is to cut out a piece from the cartilage or rooter of the animal by means of the oval or D-shaped cutting-edge, and also to remove a narrow piece from the opening thus made to and through the outer edge of the cartilage by means of the cutting-flanges, thereby leaving two projecting portions or horns on the rooter, which will so annoy the animal as to effectually prevent him from rooting.

In Figs. 4 and 5 we have shown a modified form of cutter, consisting of a crescent-shaped main cutting portion, $c$, and a single straight cutting-rib, $c'$, at the rear thereof. With this form the rooter is slitted on the lines of cutting-edges, so as to be separated into parts, as will be readily understood.

We claim as our invention—

The oval or D-shaped cutter A, having the two parallel rear cutting-flanges, $a$ $a$, in combination with the operating instrument or holder, said cutter being arranged on the holder so that when applied the parallel cutting-flanges will operate to cut the cartilage of the animal's nose from the main cut or opening outward to and through the edge of said cartilage, substantially in the manner herein set forth.

ROBERT PEMBLE, SR.
ROBERT PEMBLE, JR.
JAMES H. HAYES.

Witnesses:
ELI H. BROWN,
J. S. WININGS.